Aug. 21, 1934.　　H. T. WHEELER　　1,971,169
STUFFING BOX FOR NONRISING GATE VALVES
Filed Oct. 29, 1931

INVENTOR.
Harley T Wheeler

Patented Aug. 21, 1934

1,971,169

UNITED STATES PATENT OFFICE 1,971,169

STUFFING-BOX FOR NONRISING GATE VALVES

Harley T. Wheeler, Dallas, Tex.

Application October 29, 1931, Serial No. 571,821

5 Claims. (Cl. 308—134)

This invention relates to a stuffing-box for non-rising rotary valve stems in gate valves or similar devices and its chief advantage lies in the arrangement of the thrust washer in the stuffing-box which causes the packing to receive the end-thrust of the valve stem.

One advantage is that, while the stem is equipped with the usual collar thrust inside of the valve bonnet, the thrust friction during rotation is received by the packing.

Yet another advantage is that by using the packing to take the end-thrust of the stem, the thrust per unit area is about one-half that which occurs on the usual thrust washer.

One other advantage is that the pressure is by-passed around the stationary collar on the stem, thus eliminating much expensive machine and grinding work which is necessary with thrust washers which hold the pressure while repacking.

An advantage of consequence is that the packing and the thrust washer as herein arranged may be adjusted axially so that the stationary thrust collar does not touch the valve bonnet thus eliminating metal-to-metal contact and a high friction during rotation.

Another advantage is that a packing end-thrust creates many times less friction than the metal-to-metal thrust discs now used, and as herein arranged provides several surfaces, any of which may rotate.

Still another and important advantage is that the thrust washers as used in combination with the packing of this invention may be renewed while the valve is in service and without dismantling the valve bonnet.

Other advantages and special objects of construction will be disclosed as the following description proceeds, accompanied by the drawing, wherein.

The chief disadvantage in operating all non-rising, or rotatable stem valves, is that the end-thrust of the stem creates a very high friction at the thrust collar. This excessive friction causes galling or roughening of the thrust parts, due to lack of lubrication, the presence of temperature and the inevitable grit and foreign matter. Another factor of the friction created is the tightness of the thrust collar surfaces. If the collar is tight enough to hold the pressure, the maximum thrust will be due to the pressure which acts on the area of the collar in cross-section. If however, the pressure leaks past the collar and builds up against the packing, only the cross-sectional area of the stem will be acted upon by the pressure.

Yet it has been found that there may be less friction when the thrust collar is tight, indicating that other factors beside the pressure per unit area enter into the problem. There has been much research on the subject and all of the results are conflicting and unsatisfactory, pointing however, to excessive friction being due to high points on the metal-to-metal contacts. Also it has been found that no two consecutive test runs will agree in results.

It has been customary to lay the blame for high friction of rotatable valve stems on the manner of adjusting the packing, and the condition of the packing. But detailed tests on this subject, using many kinds of packing have proven that the packing creates from one-fifth to one-twentieth of the total friction. The erratic friction as measured is caused by the thrust collar surfaces. To eliminate most of the friction on rotatable stems and to cause a constant value is the object of this invention, chiefly by arranging the packing to receive the end-thrust of the stem during rotation and prevent any metal-to-metal contacts. This method presupposes the existence of a packing capable of automatically receiving an end-thrust without interfering with its pressure sealing capacity, no claims being made herein on this type of packing.

Figure 1:
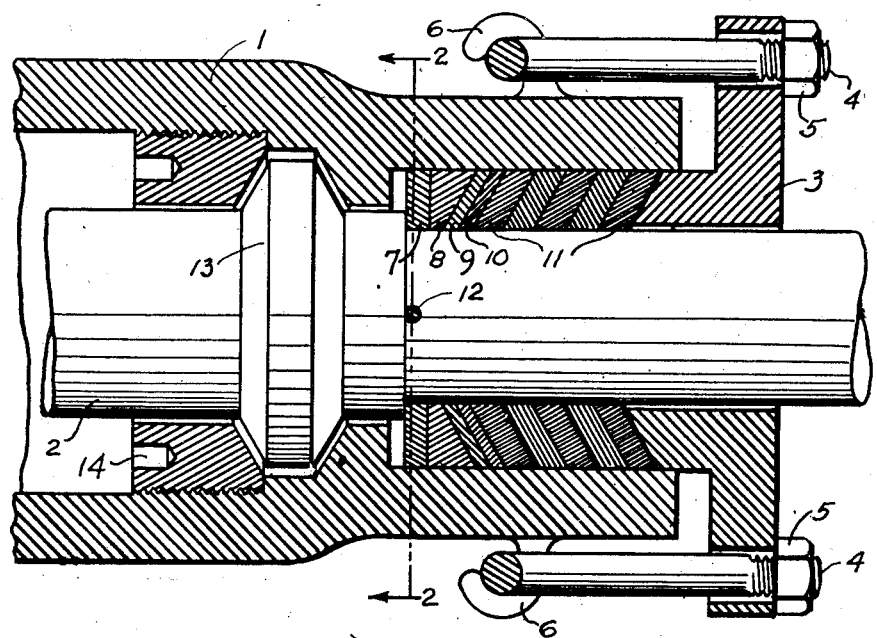
Figure 1 is a cross-section of a valve bonnet and a stuffing-box built according to this invention.

Referring now to Figure 1, a cross-section of a non-rising stem valve bonnet. The bonnet 1 is flanged to the main valve body altho this is not shown and the stem 2 is attached to the wedge, or valve disc. The conically shaped collar 13 is made integrally with the stem 2, the stem being decreased in size at the line 2—2 for the packing fit. The gland 3 is held in place by the bolts 4, 4, the latter being hooked to the body 1 by the lugs 6, 6. The nuts 5, 5 provide adjustment for the gland 3. At a shoulder on the stem 2 is placed the retainer washer 7, being notched and fixed to the stem 2 by the pin 12. The conical thrust washer 8 is a loose fit on the stem 2 and has a finished surface in contact with the retaining washer 7.

At this point, comment is made on the cone-shaped packing rings 11, being chosen because when properly made, they are the only packing rings found which will receive an end-thrust without interfering with seal capability, and as before mentioned nothing herein is claimed for the packing construction, this being reserved for other applications for Letters Patent. As the cone-shaped packing is shown in Figure 1, the floating thrust washers 8 and 9 are also cone-shaped, being made of dissimilar materials.

After the stem 2 is inserted into the body 1, a permanent and stationary retaining collar 14 is screwed into place, being so formed that the rotatable collar 13 has lateral motion between the body 1 and the collar 14. The stem 2 has operating clearances between the collar 14, the body 1 and the gland 3.

Figure 2:
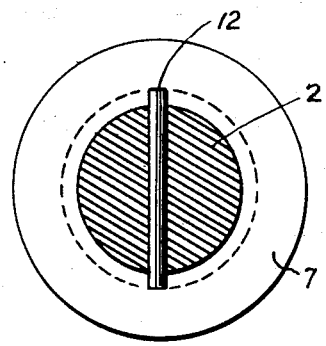
Figure 2 is a cross-section of the valve stem along line 2—2 of Figure 1.

Figure 2 is a cross-section of the valve stem along the line 2—2 of Figure 1, and shows how the retainer washer 7 is notched to receive the projecting ends of the pin 12 located in the stem 2.

Figure 3:
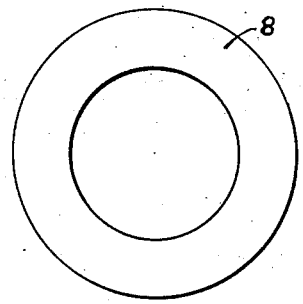
Figure 3 is a partial cross-section and elevation of the valve stem thrust washer.

Figure 3 is an elevational view and partial cross-section of the main floating thrust washer 8.

Figure 4:
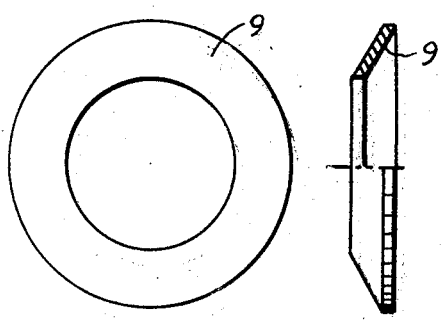
Figure 4 is a partial cross-section and elevation of the floating thrust washer.

Figure 4 is an elevational and partial cross-section of the auxiliary floating thrust washer 9, made in shape to be a perfect fit to the main thrust washer 8, of Figure 3.

The assembly of this invention is accomplished by inserting the stem 2 into the bonnet 1 with the pin 12 in place and then screwing the retainer collar 14 tightly into place by means of the spanner holes. Lateral and radial clearance is allowed around the collar 13. The foregoing installation work is done before the bonnet 1 is attached to the main valve body.

The assembly of the thrust washers is performed from the outside, the washer 7 being placed against the shoulder on the stem at line 2—2 and its notches aligned with the pin 12. The floating washers 8 and 9 follow and then the set of packing rings 11. The gland 3 is then brought to place and adjusted by the nuts 5, 5 on the bolts 4, 4 which are hooked to the bonnet 2 at the lugs 6, 6.

It should now be apparent that if the packing rings 11 are so constructed to take the end-thrust of the stem 2 that the gland 3 may be so positioned that the stem collar 13 will have lateral clearance on both ends and that any rotation will cause the end-thrust to take place between the surfaces of the washers 7 and 8, or 8 and 9, or 9 and 10, or at the surface of the inner packing ring 11. The thrust washers 7, 8, 9, and 10 are of dissimilar materials and the additional thrust face of a packing ring 11 forms four contact surfaces which may move on each other.

Experiment has established that a change of temperature, a difference in the gravity of a liquid, the presence of foreign matters and the like, create a wide variation in friction of the contact of any two materials which is not proportional to the pressure, or thrust impressed. Also it has been learned that some materials contact at a low friction under adverse conditions and may have a high friction during normal conditions, while other materials behave oppositely. Obviously it is physically impossible for a single thrust washer on a valve stem to take an end-thrust efficiently under all of the foregoing named conditions. The materials of this device are so chosen that rotation may occur with a minimum of friction under a wide variation of conditions, there being several dissimilar surfaces to move, and whichever has the lowest friction under the condition obtaining will form the thrust surface.

During the operations of jamming the valve disc into its seat, or of breaking it away from its seat, the packing rings 11 would not endure the compression necessary. The collar 13, having a small lateral clearance on either end is free to move against the bonnet 1 or the retainer collar 14 while the movement of the valve disc into or out of its seat is accomplished. When the disc is off of its seat, the rotating and end-thrust is resisted by the floating rings 8, 9 and 10 and the adjacent surface of a packing ring 11. The end-thrust and packing friction of this device has been found to be about one-fourth that of a single thrust washer as ordinarily constructed. When the packing is adjusted too tightly, the collar 13 will contact with the retainer washer 14 and warn the operator, by a much higher friction, that the gland 3 should be loosened.

Referring now to the universally constructed valve stem thrust washer, which would be the same as Figure 1 without the retainer 7 and the floating collars 8, 9 and 10. If the collar 13 makes a tight joint against the bonnet 1 and the end-thrust against the bonnet will be the unit pressure times the radial cross-sectional area of the collar 13. If the joint leaks, the pressure per unit area is decreased, but it has been found that the friction does not necessarily do so. If the joint leaks it is because of high spots on the contacting surfaces or the presence of grit, either of which will increase the friction far more than proportionally than the areas in consideration would warrant. That is, leakage around the collar 13 will decrease the end-thrust if the surfaces are not roughened.

The method of by-passing the pressure around the collar 13 is used in this device by preventing a contact, so that the only end-thrust which can obtain is the unit pressure times the radial cross-section of the stem. This total end-thrust is then transferred to the retainer washer 7, which redistributes the thrust to the floating washers 8, 9 and 10, and thence to the packing. By this transposition, the pressure per unit of area is distributed over a larger area of the packing, causing a unit pressure on the packing about one-half the amount which would obtain with the thrust collar 13 used as the only thrust.

The most serious objection to the present method of enclosing the thrust washer within the bonnet is that the valve must be taken out of service to make repairs. It is a common occurrence to employ several men to open and close a non-rising stem gate valve chiefly because dirt and rust has roughened the thrust washer. Such washers under test take thousands of pounds per unit of area in contact to move them. In my device as described, the valve disc may be jammed open or closed by a momentary contact between the collar 13 and the stationary contacts. During rotation the packing creates a low friction and receives all of the end-thrust. Then the thrust washers may be removed or blown out of the stuffing-box and an entire new set replaced in a very short time. Thus the thrust and friction of a valve may be kept at a normal operating requirement without interrupting service. This is an improvement over an internally positioned thrust collar designed to hold the pressure while the disc is jammed into its seat, or the thrust collar jammed by running the stem into the disc. Erosion and corrosion etch the surfaces and destroy the machined finish of valve stem thrust washers and collars and pressure can rarely be held. In this device, should the collar 13 leak, the thrust washers and a new set of packing can readily be installed by my system for temporarily restraining packing in a stuffing-box as shown by an application for Letters Patent, Serial Number 471,830, filed July 30, 1930. Nothing herein is claimed for the loading system, mention being made to show the possibility of repacking this type of a combination thrust washer and packing.

My method and design for causing a set of packing to receive an end-thrust obviously applies to a shift which may be rotated or is stationary, and a safety thrust collar such as 13 in Figure 1, may or may not be used. Such applications however as may be included in the spirit of this invention are construed to be included in the following claims:

I claim:

1. A rotatable shaft subjected to an end thrust due to fluid pressure, an integral circumferential flange thereon having outer and inner tapered ends, a box about said shaft, stop seats in said box spaced slightly from said tapered ends to allow a limited longitudinal movement of said shaft in both directions and adapted to seal therewith on said movement, packing about said shaft, thrust rings at the inner end of said packing and means on said shaft engageable with said thrust rings to transmit said end thrust to said packing, said flange acting to take up excessive thrust in either direction.

2. A rotatable shaft subjected to an end thrust due to fluid pressure, an integral, circumferential flange thereon having outer and inner tapered ends, a box about said shaft, stop seats in said box spaced slightly from said tapered ends to allow a limited longitudinal movement of said shaft, in both directions and adapted to seal therewith on said movement, packing about said shaft, thrust rings at the inner end of said packing, and a shoulder on said shaft outwardly from said flange, said shoulder engaging said thrust rings to transmit said end thrust to said packing, said flange acting to take up excessive thrust in either direction.

3. A rotatable shaft subjected to an end thrust due to pressure fluid, a box about said shaft, means on said shaft engageable with said box to allow a slight movement only in both directions but adapted to form a seal when engaged with said box, packing about said shaft in said box, thrust rings adjacent said packing and a shoulder on said shaft engaging said rings to transmit said end thrust to said packing.

4. A box, a shaft rotatable therein subject to a longitudinal thrust from pressure fluid, an annular flange on said shaft, means associated with said flange to limit the longitudinal movement of said shaft in said box, sealing rings in said box, thrust rings adjacent said packing rings, and means on said shaft engaging said thrust rings to transmit the end thrust on said shaft to said packing.

5. A box, a shaft rotatable therein subject to a longitudinal thrust from pressure fluid, an annular flange on said shaft, means associated with said flange to limit the longitudinal movement of said shaft in said box, sealing rings in said box, thrust rings adjacent said packing rings, and a shoulder on said shaft, a retainer washer nonrotatably mounted on said shaft adjacent said shoulder and bearing against said thrust rings for the purpose described.

HARLEY T. WHEELER.